US012497294B2

(12) United States Patent
Chiu et al.

(10) Patent No.: US 12,497,294 B2
(45) Date of Patent: Dec. 16, 2025

(54) METHODS FOR REMOVING WATER FROM IODINE (I2)

(71) Applicant: Solstice Advanced Materials US, Inc., Morris Plains, NJ (US)

(72) Inventors: Yuon Chiu, Denville, NJ (US); Haiyou Wang, Amherst, NY (US); Haluk Kopkalli, Staten Island, NY (US); Christian Jungong, Depew, NY (US); Haridasan K. Nair, Williamsville, NY (US); Rajiv Ratna Singh, Getsville, NY (US); Daniel C. Merkel, Orchard Park, NY (US); Tao Wang, Shanghai (CN); Terris Yang, Amherst, NY (US); Richard Wilcox, West Caldwell, NJ (US)

(73) Assignee: Solstice Advanced Materials US, Inc., Morris Plains, NJ (US)

( * ) Notice: Subject to any disclaimer, the term of this patent is extended or adjusted under 35 U.S.C. 154(b) by 709 days.

(21) Appl. No.: 17/572,547

(22) Filed: Jan. 10, 2022

(65) Prior Publication Data

US 2022/0219981 A1 Jul. 14, 2022

Related U.S. Application Data

(60) Provisional application No. 63/137,463, filed on Jan. 14, 2021.

(51) Int. Cl.
*C01B 7/14* (2006.01)
*B01D 53/04* (2006.01)

(52) U.S. Cl.
CPC ............ *C01B 7/14* (2013.01); *B01D 53/0462* (2013.01); *B01D 2252/10* (2013.01);
(Continued)

(58) Field of Classification Search
CPC ............... B01D 59/22; B01D 53/0462; B01D 2257/80; C01P 2006/82
See application file for complete search history.

(56) References Cited

U.S. PATENT DOCUMENTS

| 1,857,632 A | 5/1932 | Girvin |
| 2,385,483 A | 9/1945 | Wolff |

(Continued)

FOREIGN PATENT DOCUMENTS

| CN | 102583249 A | * | 7/2012 | |
| CN | 107055474 A | * | 8/2017 | ............... C01B 7/14 |
| JP | 2005289936 A | * | 10/2005 | |

OTHER PUBLICATIONS

English translation of CN107055474A.*
(Continued)

*Primary Examiner* — Anthony J Zimmer
*Assistant Examiner* — Jaanzeb C Raja
(74) *Attorney, Agent, or Firm* — Faegre Drinker Biddle & Reath LLP (57) ABSTRACT

A method of removing water from a mixture of iodine ($I_2$) and water includes providing a mixture comprising iodine and water and: contacting the mixture with an adsorbent to selectively adsorb water from the mixture, contacting the mixture with a concentrated acid to absorb water from the mixture, separating the water from mixture by distillation, contacting the mixture with a gas that is inert to iodine ($I_2$), contacting the mixture with hydrogen iodide (HI), or combinations thereof.

16 Claims, 2 Drawing Sheets

(52) U.S. Cl.
CPC ...... *B01D 2252/40* (2013.01); *B01D 2257/80* (2013.01); *C01P 2006/82* (2013.01)

(56) References Cited

U.S. PATENT DOCUMENTS

| | | | | |
|---|---|---|---|---|
| 2,870,066 | A * | 1/1959 | Pierotti | C01B 7/14 |
| | | | | 203/50 |
| 3,044,862 | A * | 7/1962 | Paul | C01B 7/13 |
| | | | | 423/500 |
| 4,176,169 | A * | 11/1979 | Mysels | C01B 7/14 |
| | | | | 423/501 |
| 4,461,711 | A | 7/1984 | Behrens | |
| 6,752,852 | B1 * | 6/2004 | Jacksier | B01J 20/18 |
| | | | | 252/372 |
| 2019/0358580 | A1 * | 11/2019 | Liu | B01D 53/228 |

OTHER PUBLICATIONS

English translation of CN107055474A. (Year: 2017).*
International Preliminary Report on Patentability received for PCT Patent Application No. PCT/US2022/070176, mailed on Jul. 27, 2023, 7 pages.
International Search Report and Written Opinion received for PCT Patent Application No. PCT/US2022/070176, mailed on May 2, 2022, 11 pages.

* cited by examiner

METHODS FOR REMOVING WATER FROM IODINE (I2)

CROSS-REFERENCE TO RELATED APPLICATION

This application claims priority to Provisional Application No. 63/137,463, filed Jan. 14, 2021, which is herein incorporated by reference in its entirety.

FIELD

The present disclosure relates to processes for producing anhydrous iodine ($I_2$). Specifically, the present disclosure relates to methods of removing water from iodine ($I_2$) using various separation techniques.

BACKGROUND

Anhydrous hydrogen iodide (HI) is an important industrial chemical that may be used in the preparation of hydroiodic acid, organic and inorganic iodides, iodoalkanes, and as a reducing agent.

In commercial production of hydrogen iodide (HI), iodine ($I_2$) is often used as the starting material as shown below in Equation 1:

$$H_2 + I_2 \rightarrow 2HI. \qquad \text{Equation 1}$$

The raw materials, (iodine ($I_2$) and hydrogen ($H_2$)) contain water which may be present in the product HI. In turn, the presence of water in iodine ($I_2$) and/or hydrogen iodide (HI) is corrosive to most alloys, thereby causing damage to downstream manufacturing and processing equipment.

Additionally, water, iodine ($I_2$) and HI can form a ternary mixture. The presence of water could result in the formation of this mixture, which may have a detrimental impact on product separation resulting in reduced yields.

What is needed is a method to produce iodine ($I_2$) that is substantially free of water for use in the manufacture of HI from iodine ($I_2$) and hydrogen ($H_2$).

SUMMARY

The present application provides methods for removing water from iodine ($I_2$).

In one embodiment, a method of removing water from a mixture of iodine ($I_2$) and water includes providing a mixture comprising iodine and water and contacting the mixture with an adsorbent to selectively adsorb water from the mixture.

In another embodiment, a method of removing water from a mixture of iodine ($I_2$) and water includes providing a mixture comprising iodine and water and contacting the mixture with a concentrated acid to absorb water from the mixture.

In another embodiment, a method of removing water from a mixture of iodine ($I_2$) and water includes providing a mixture comprising iodine and water and separating the water from mixture by distillation.

In another embodiment, a method of removing water from a mixture of iodine ($I_2$) and water includes providing a mixture comprising iodine and water and contacting the mixture with a gas that is inert to iodine ($I_2$), the gas stripping water from the mixture.

In another embodiment, a method of removing water from a mixture of iodine ($I_2$) and water includes providing a mixture comprising iodine and water and contacting the mixture with hydrogen iodide (HI), the hydrogen iodide (HI) stripping water from the mixture.

Other embodiments may combine any of the previous embodiments, such as drying with a concentrated acid, followed by further drying with an adsorbent, for example.

DETAILED DESCRIPTION

The present disclosure provides methods for removing water from iodine ($I_2$). Specifically, the present disclosure provides methods to remove water from solid iodine ($I_2$) (e.g. prills, flakes, powder, small chunks, larger chunks, combination of two or more of these), liquid iodine ($I_2$), or a combination of liquid and solid iodine ($I_2$) (for example, iodine in the process of melting). The iodine ($I_2$) may be fresh (i.e. as received from supplier), recovered from this process, or a combination. The iodine ($I_2$), recycled iodine ($I_2$), hydrogen iodide (HI) or selected drying gas, inert drying gas, desiccants, or sorbents may contain a variety of in-process impurities include the aforementioned compounds, iodine containing organics, hydrogen ($H_2$) and others. The iodine ($I_2$) may be used to produce hydrogen iodide (HI) in a gas phase reaction of hydrogen ($H_2$) and iodine ($I_2$) according to Equation 1 above.

The anhydrous iodine ($I_2$) is substantially free of water. That is, any water in the anhydrous iodine is in an amount by weight less than about 500 parts per million, about 300 ppm, about 200 ppm, about 100 ppm, about 50 ppm, about 30 ppm, about 20 ppm, about 10 ppm, about 5 ppm, about 3 ppm, about 2 ppm, or about 1 ppm, or less than any value defined between any two of the foregoing values. Preferably, the anhydrous iodine comprises water by weight in an amount less than about 100 ppm. More preferably, the anhydrous iodine comprises water by weight in an amount less than about 10 ppm. Most preferably, the anhydrous iodine comprises water by weight in an amount less than about 1 ppm.

Briefly, the manufacturing process to make hydrogen iodide (HI) from iodine ($I_2$) via the above reaction (Equation 1) comprises the following steps: i) liquefying the solid iodine ($I_2$), ii) vaporization of liquid iodine ($I_2$), iii) catalytic gas phase reaction of iodine ($I_2$) and hydrogen ($H_2$) in a reactor, iv) iodine ($I_2$) recovery and recycling, v) recovery/recycling of hydrogen ($H_2$) and hydrogen iodide (HI), and vi) product purification. This process is described in greater detail below.

In the context of these processes, there are at least two sources of undesired water. First, both starting materials—iodine ($I_2$) and hydrogen ($H_2$) contain certain levels of water. Second, while handling the starting materials, particularly iodine ($I_2$), water ingress is inevitable. The water thereby brought to the process may become concentrated within the iodine ($I_2$) liquefier, the iodine ($I_2$) vaporizer, the reactor, the desublimator, and the residual iodine ($I_2$) recovery system. As aforementioned, the elevated level of water may have several detrimental impacts, including, but not limited to, catalyst deactivation, accelerated corrosion of equipment, and lowered yields as a result of increased side reactions including the conversion of iodine ($I_2$) and oxygen present in water to corrosion products.

The concentration of water in the iodine ($I_2$) to be treated can be as low as about 500 ppm (parts per million by weight), 600 ppm, 700 ppm, 800 ppm, 1,000 ppm, 1,200 ppm or 1,400 ppm, or as high as 1,700 ppm, 2,000 ppm, 2,500 ppm, 3,000 ppm, 3,500 ppm, 4,000 ppm, 4,500 ppm or 5,000 ppm, or be within any range defined between any two of the foregoing values, such as 500 ppm to 5,000 ppm, 600 ppm to 4,500 ppm, 700 ppm to 4,000 ppm, 800 ppm to 3,500 ppm, 1,000 ppm to 3,000 ppm, about 1,200 ppm to about 2,500 ppm, about 1,400 ppm to about 2,000 ppm, about 1,000 ppm to about 1,700 ppm, about 2,000 ppm to about 3,000 ppm, about 500 ppm to about 1,000 ppm, or about 1,000 ppm to about 3,000 ppm, for example.

Removal of Water by Distillation

The present disclosure provides a method for the removal of water from iodine ($I_2$) via distillation. The iodine ($I_2$) may be in liquid or vapor phase. The initial stream of liquid or vapor phase iodine ($I_2$) is passed to a distillation column to separate and remove water. The operating temperature of the distillation column is sufficiently high to prevent the iodine ($I_2$) from solidifying.

The separated water passes to the distillation column overhead, while iodine ($I_2$) that is reduced in, or free of, water moves to the bottom of the distillation column. The column may be installed after the iodine ($I_2$) liquefier, after the iodine ($I_2$) vaporizer, after the desublimator, or after the residual iodine ($I_2$) recovery system. Preferably, the distillation column is installed after the iodine ($I_2$) liquefier such that fresh, incoming iodine ($I_2$) is treated to remove water before passing through the remaining equipment. It is anticipated that this placement of the distillation column will result in reduced corrosion of down-stream equipment, including the reactor, desublimator, and residual unreacted iodine ($I_2$) recovery system, as well as reduced side reactions involving water.

Removal of Water Using Concentrated Acid

The present disclosure also provides a method for removing water from an initial stream of iodine ($I_2$) using a concentrated acid. Suitable concentrated acids include sulfuric acid ($H_2SO_4$), phosphoric acid ($H_3PO_4$), and metaphosphoric acid ($HPO_3$). For example, the percentage of sulfuric acid strength of sulfuric acid can be ranged from 95% to 100%. In some embodiments, the sulfuric acid is oleum or fuming sulfuric acid.

The iodine can be in a liquid phase or a vapor phase. If in a liquid phase, an initial stream of liquid phase iodine ($I_2$) may be treated with concentrated acid, such as a concentrated sulfuric acid ($H_2SO_4$), to remove water. The liquid phase process may be performed by melting iodine ($I_2$) at 114° C. or higher, followed by mixing the liquid iodine ($I_2$) with the concentrated acid in a mixing tank or a liquid-liquid extraction tower. From the mixing tank or liquid-liquid extraction tower, the product stream of dried iodine ($I_2$) may be recovered by phase separation. The lighter concentrated acid liquid phase would be recycled until it is no longer able to absorb water. A small purge of the concentrated acid liquid phase is expected to remove the extracted water, from which iodine ($I_2$) and any iodides could be recovered.

The mixing tank or liquid-liquid extraction tower may be installed after the iodine ($I_2$) liquefier, or after the desublimator. Preferably, it is installed after the iodine ($I_2$) liquefier, so that fresh, incoming iodine ($I_2$) is first treated to remove the water. Thus, corrosion of down-stream equipment—including the reactor, desublimator, and residual un-reacted iodine ($I_2$) recovery system—is reduced, and side reactions involving water are limited.

If the iodine is in the vapor phase, the process may be performed by melting the iodine at 114° C. or higher, and then vaporizing the melted iodine at a temperature of 184° C. or higher at atmospheric pressure. Other pressures sub-atmospheric or super-atmospheric can be used, requiring different vaporizing temperatures. The vaporized iodine is mixed with the concentrated acid in a gas-liquid mixing contactor to absorb the water. The concentrated acid absorbent can be recycled until it is no longer able to absorb water. A small purge of the concentrated acid liquid phase is expected to remove the extracted water, from which iodine ($I_2$) and any iodides could be recovered.

Operating at atmospheric pressure, the contactor is maintained at a temperature as low as about 190° C., about 195° C., about 200° C., about 205° C. or about 210° C., or as high as about 215° C., about 220° C., about 225° C. or about 230° C. or at a temperature within any range defined between any two of the foregoing values, such as about 190° C. to about 230° C., about 195° C. to about 225° C., about 200° C. to about 220° C., about 205° C. to about 215° C., about 210° C. to about 220° C., about 215° C. to about 230° C., about 190° C. to about 200° C. or about 195° C. to about 230° C., for example. In some embodiments, the operating pressure can be sub-atmospheric to reduce the operating temperature.

The contactor can be a counter-current packed or trayed tower in which the iodine vapor enters at the bottom of the tower and exits at the top of the tower while the liquid concentrated acid is fed into the top of the tower and exits at the bottom of the tower. Alternatively, the contactor can be a co-current packed or trayed tower in which both the iodine vapor and the concentrated acid flow through the tower in the same direction. Alternatively, the contactor can be a mixed tank in which the iodine vapor and the liquid concentrated acid are intimately mixed. Alternatively, the contactor can be an eductor in which the liquid concentrated acid is circulating through the eductor to intimately mix with the iodine vapor being drawn into the eductor. The contactor can include multiple contactor units.

The contactor may be installed after the iodine ($I_2$) vaporizer, or after the desublimator. Preferably, it is installed after the iodine ($I_2$) vaporizer, so that fresh, incoming iodine ($I_2$) is first treated to remove the water. Thus, corrosion of down-stream equipment—including the reactor, desublimator, and residual un-reacted iodine ($I_2$) recovery system—is reduced, and side reactions involving water are limited.

Removal of Water with Solid Adsorbents

The present disclosure further provides a method for the removal of water from iodine ($I_2$) through the use of solid adsorbents. An initial stream of iodine ($I_2$) in either liquid or vapor phase is sent to a column charged with one or more solid adsorbents to adsorb moisture. Preferably, the initial stream of iodine ($I_2$) is in the vapor phase. The desiccant vessel is maintained at a temperature high enough to prevent the iodine ($I_2$) from solidifying.

Suitable solid adsorbents may include molecular sieves (3 Å, 4 Å, 5 Å, XH-9, etc.), silica gel, alumina, calcium sulfate (Drierite), calcium chloride, calcium iodide, magnesium chloride, magnesium iodide, phosphorous pentoxide, UZM Zeolite (aluminosilicate), Sorbead WS (silica gel) with calcium nitrate, and hydrotalcite among others. The solid adsorbents may be used in bulk form, or may be supported on a support material, such as alumina, silica gel or silicon carbide, for example. The solid adsorbents may be regenerated or replaced after reaching adsorption saturation. The selection of appropriate adsorbents is further described below, in Example 5.

The adsorbent may be regenerated by heating the adsorbent to a temperature as low as about 150° C., about 175°, about 200° C., about 225° C. or about 250° C., or as high as about 275° C., about 300° C., about 325° C. or about 350° C., or to a temperature within any range defined between any two of the foregoing values, such as about 150° C. to about 350° C., about 175° C. to about 325° C., about 200° C. to about 300° C., about 225° C. to about 300° C., about 150° C. to about 250° C., or about 200° C. to about 300° C., for example.

The vessel containing the desiccant may be installed after the iodine ($I_2$) liquefier, the iodine ($I_2$) vaporizer, or the desublimator. Preferably, it is installed after the iodine ($I_2$) liquefier or vaporizer, such that the fresh, incoming iodine ($I_2$) is first treated to provide a product stream of iodine ($I_2$) that is substantially free of water for use in the production process. It is expected that this will result in reduced corrosion of down-stream equipment including the reactor, desublimator, and residual un-reacted iodine ($I_2$) recovery system, as well as limiting side reactions involving water.

Removal of Water with Hydrogen Iodide (HI)

The present disclosure also provides a method to remove water from fresh or recycled iodine ($I_2$) by contacting the iodine ($I_2$) with hydrogen iodide (HI). The fresh and/or recycled iodine ($I_2$) comprises an initial stream of iodine ($I_2$) that may be contacted with hydrogen iodide (HI). This mixture is evaporated to drive off the hydrogen iodide (HI). Because the hydrogen iodide (HI) has a high affinity for water, it will carry out the water with it, leaving behind iodine ($I_2$) with a very low water content. Very little iodine ($I_2$) is removed with the hydrogen iodide (HI); thus, this method may be used to selectively remove water from iodine ($I_2$). When performed at high temperature, the method may also include high pressure to suppress the evaporation of iodine ($I_2$) into the hydrogen iodide (HI).

The iodine ($I_2$) can contact the hydrogen iodide (HI) via a multi-stage distillation column. The iodine ($I_2$) is fed to the top of a multi-stage column, while hydrogen iodide (HI) is fed to the bottom of the column. The counter-current contact between the wet iodine ($I_2$) and dry hydrogen iodide (HI) will progressively increase, thereby removing more water and resulting in the iodine ($I_2$) which emerges at the bottom of the column having a very low residual water content. A reboiler may be incorporated into the column design to assist in driving off the water from the iodine ($I_2$).

The hydrogen iodide (HI) containing water may be passed to a distillation column in which anhydrous hydrogen iodide (HI) is distilled to the column overhead, while the hydrogen iodide containing a concentrated water phase passes to the column bottom. The anhydrous hydrogen iodide (HI) may be reused to dry further quantities of iodine ($I_2$). The bottoms product may be purged to remove the water. As disclosed in co-pending U.S. application 63/137,470, METHODS FOR PRODUCING ANHYDROUS HYDROGEN IODIDE (HI), since HI and water form a high-boiling azeotrope, in some embodiments the HI stream including water may be subjected to pressure-swing distillation and/or an extractive distillation. Alternately, only the bottoms stream may be subjected to breaking the azeotrope via pressure-swing distillation and/or an extractive distillation.

The hydrogen iodide (HI) used to remove water from the iodine ($I_2$) may be the same hydrogen iodide (HI) produced by the reaction of hydrogen ($H_2$) and iodine ($I_2$) shown in Equation 1, provided that it is sufficiently dry to absorb more water. This may be determined based the vapor-liquid equilibrium (VLE) of the HI/water system.

A series of liquid-vapor contacting devices, such as flash drums or bubblers, in which the liquid and vapor in each device are contact one another in a counter-current flow manner as in the multi-stage column may achieve the same effect as the above-mentioned multi-stage column. The use of discrete contacting devices in series may allow for better management of the iodine ($I_2$) such that de-sublimation or solidification may be prevented when there is insufficient quantity of liquid hydrogen iodide (HI) in contact with the iodine ($I_2$) at temperatures below 116° C.

Removal of Water Using Inert Gas

The present disclosure also provides a method for removing water from iodine ($I_2$) by contacting the iodine ($I_2$) with a stream of heated nitrogen ($N_2$), air, carbon dioxide ($CO_2$), argon, helium or any other gas that is inert to iodine ($I_2$), such as pentafluoropropane (HFC-245fa), 2,2-dichloro-1,1,1-trifluoroethane (HCFC-123), 1-chloro-1,2,2,2-tetrafluoroethane (HCFC-124), pentafluoroethane (HFC-125), 1,1,1,2-tetrafluoroethane (HFC-134a), difluoromethane (HFC-32), and trifluoroiodomethane ($CF_3I$), for example.

The fresh and/or recycled iodine ($I_2$) comprises an initial stream of iodine ($I_2$) that may be contacted with the dry inert gas. This mixture is evaporated to drive off the inert gas which is enriched in water. Because the inert gas is essentially free of water, it will carry out the water with it, leaving behind iodine ($I_2$) with a very low water content. Very little iodine ($I_2$) is removed with the inert gas; thus, this method may be used to selectively remove water from iodine ($I_2$). When performed at high temperature, the method may also include high pressure to suppress the evaporation of iodine ($I_2$) into the inert gas.

The iodine ($I_2$) can contact the inert gas via a multi-stage stripping column. The iodine ($I_2$) is fed to the top of a multi-stage stripping column, while the inert gas is fed to the bottom of the column. The counter-current contact between the wet iodine ($I_2$) and dry inert gas will progressively increase, thereby removing more water and resulting in the iodine ($I_2$) which emerges at the bottom of the column having a very low residual water content. A reboiler may be incorporated into the column design to assist in driving off the water from the iodine ($I_2$).

In some embodiments, a series of liquid-vapor contacting devices, such as flash drums or bubblers, in which the liquid and vapor in each device are contact one another in a counter-current flow manner as in the multi-stage column may achieve the same effect as the above-mentioned multi-stage column. The use of discrete contacting devices in series may allow for better management of the iodine ($I_2$) such that de-sublimation or solidification may be prevented when there is insufficient quantity of inert gas in contact with the iodine ($I_2$) at temperatures below 116° C.

In some other embodiments, a single stage liquid-vapor contacting device, such as a flash drum can be used, for example. In some other embodiments, a co-current liquid-vapor contacting device can be used, such as a falling film apparatus, for example. In some embodiments, the iodine ($I_2$) can contact the inert gas during pneumatic conveying of the iodine ($I_2$), in which the gas used to convey the iodine is the inert gas.

Other suitable gases for use in this method will also have low water content in order to effectively strip water from the iodine ($I_2$). Chemical components which exhibit affinity for water or are capable of forming an azeotrope with water are also appropriate for use in this method.

Figure 1:
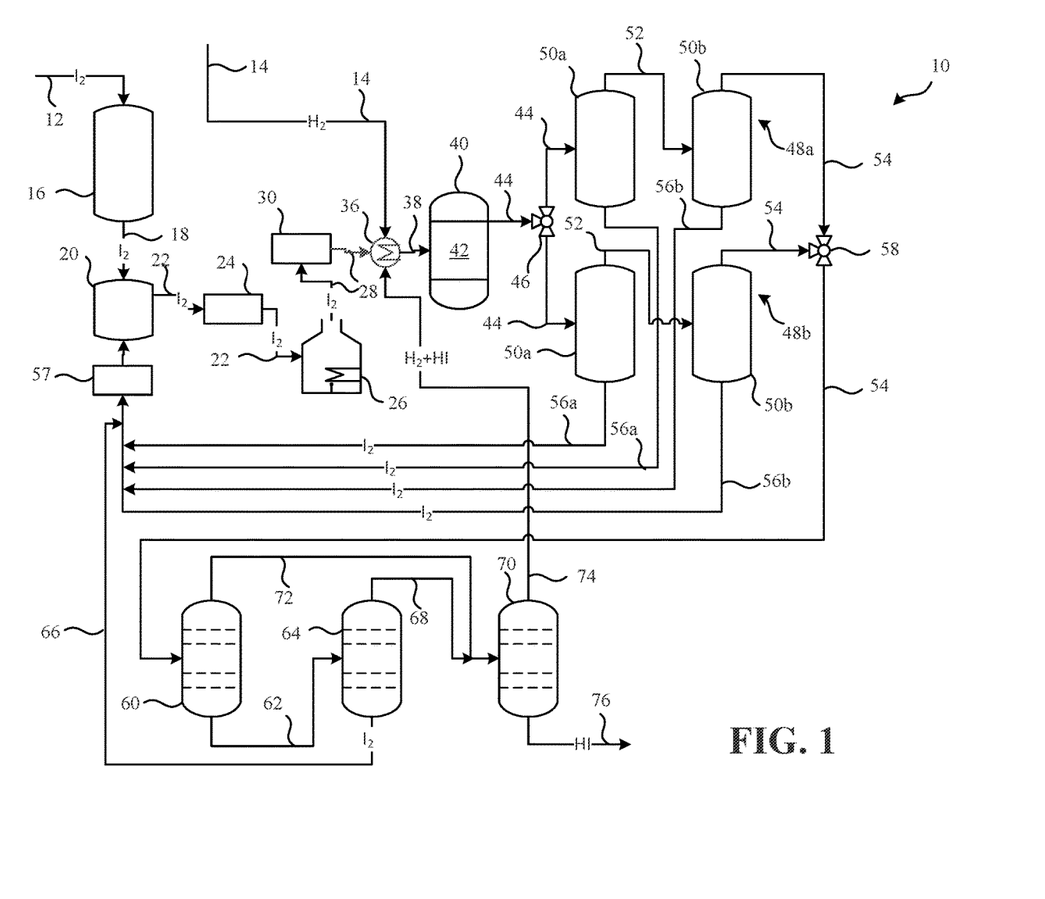
FIG. 1 is a process flow diagram showing an integrated process for manufacturing anhydrous hydrogen iodide from iodine and hydrogen.

An integrated process can be used for the manufacture of hydrogen iodide from iodine and hydrogen, as shown in Equation 1 above. FIG. 1 is a process flow diagram showing this process. As shown in FIG. 1, an integrated process 10 includes material flows of solid iodine 12 and hydrogen gas 14. The solid iodine 12 may be continuously or intermittently added to a solid storage tank 16. A flow of solid iodine 18 is transferred, continuously or intermittently, by a solid conveying system (not shown) or by gravity from the solid storage tank 16 to an iodine liquefier 20 where the solid iodine is heated to above its melting point but below its boiling point to maintain a level of liquid iodine in the iodine liquefier 20. Although only one liquefier 20 is shown, it is understood that multiple liquefiers 20 may be used in a parallel arrangement.

As described above, the liquid iodine 22 includes iodine and some water, either from the iodine as received or from atmospheric exposure during handling and transferring operations. The liquid iodine 22 flows from the iodine liquefier 20 to first iodine dryer 24. The first iodine dryer 24 may incorporate any of the methods for removing water from a mixture of iodine and water and suitable for a liquid phase mixture, as described herein. The dried liquid iodine 22 flows from the first iodine dryer 24 to an iodine vaporizer 26. In the iodine vaporizer 26, the iodine is heated to above its boiling point to form a flow of iodine vapor 28.

The flow of iodine vapor 28 flows from the iodine vaporizer 26 to a second iodine dryer 30. The second iodine dryer 30 may incorporate any of the methods for removing water from a mixture of iodine and water and suitable for a vapor phase mixture, as described herein. The flow of dried iodine vapor 28 and the flow of hydrogen 14 are provided to a superheater 36 and heated to the reaction temperature to form a reactant stream 38. The reactant stream 38 is provided to a reactor 40.

The reactant stream 38 reacts in the presence of a catalyst 42 contained within the reactor 40 to produce a product stream 44. The catalyst 42 may be any of the catalysts described herein. The product stream 44 may include hydrogen iodide, unreacted iodine, unreacted hydrogen and trace amounts of water and other high boiling impurities.

The product stream 44 may be provided to an upstream valve 46. The upstream valve 46 may direct the product stream 44 to an iodine removal step. Alternatively, the product stream 44 may pass through a cooler (not shown) to remove some of the heat before being directed to the iodine removal step. In the iodine removal step, a first iodine removal train 48a may include a first desublimator 50a and a second desublimator 50b. The product stream 44 may be cooled in the first desublimator 50a to a temperature below the boiling point of the iodine to condense or desublimate at least some of the iodine, separating it from the product stream 44. The product stream 44 may be further cooled in the first desublimator 50a to a temperature below the melting point of the iodine to separate even more iodine from the product stream 44, depositing at least some of the iodine within the first desublimator 50a as a solid and producing a reduced iodine product stream 52. The reduced iodine product stream 52 may be provided to the second desublimator 50b and cooled to separate at least some more of the iodine from the reduced iodine product stream 52 to produce a further crude hydrogen iodide product stream 54.

Although the first iodine removal train 48a consists of two desublimators operating in a series configuration, it is understood that the first iodine removal train 48a may include two or more desublimators operating in a parallel configuration, more than two desublimators operating in a series configuration, or any combination thereof. It is also understood that the first iodine removal train 48a may consist of a single desublimator. It is further understood that any of the desublimators may include, or be in the form of, heat exchangers. It is also understood that consecutive vessels may be combined into a single vessel having multiple cooling stages.

The iodine collected in the first desublimator 50a may form a first iodine recycle stream 56a. Similarly, the iodine collected in the second desublimator 50b may form a second iodine recycle stream 56b. Each of the first iodine recycle stream 56a and the second iodine recycle stream 56b are provided to a third iodine dryer 57. The third iodine dryer 57 may incorporate any of the methods for removing water from a mixture of iodine and water, as described herein. Each of the dried first iodine recycle stream 56a and the dried second iodine recycle stream 56b are provided continuously or intermittently to the iodine liquefier 20, as shown, and/or to the iodine vaporizer 26.

In order to provide continuous operation while collecting the iodine in solid form, the upstream valve 46 may be configured to selectively direct the product stream 44 to a second iodine removal train 48b. The second iodine removal train 48b may be substantially similar to the first iodine removal train 48a, as described above. Once either the first desublimator 50a or the second desublimator 50b of the first iodine removal train 48a accumulates enough solid iodine that it is beneficial to remove the solid iodine, the upstream valve 46 may be selected to direct the product stream 44 from the first iodine removal train 48a to the second iodine removal train 48b. At about the same time, a downstream valve 58 configured to selectively direct the crude hydrogen iodide product stream 54 from either of the first iodine removal train 48a or the second iodine removal train 48b may be selected to direct the crude hydrogen iodide product stream 54 from the second iodine removal train 48b so that the process of removing the iodine from the product stream 44 to produce the crude hydrogen iodide product stream 54 may continue uninterrupted. Once the product stream 44 is no longer directed to the first iodine removal train 48a, the first desublimator 50a and the second desublimator 50b of the first iodine removal train 48a may be heated to above the melting point of the iodine, liquefying the solid iodine so that it may flow through the first iodine recycle stream 56a and the second iodine recycle stream 56b of the first iodine removal train 48a.

As the process continues and either of the first desublimator 50a or the second desublimator 50b of the second iodine removal train 48b accumulates enough solid iodine that it is beneficial to remove the solid iodine, the upstream valve 46 may be selected to direct the product stream 44 from the second iodine removal train 48b back to the first iodine removal train 48a, and the downstream valve 58 may be selected to direct the crude hydrogen iodide product stream 54 from the first iodine removal train 48a so that the process of removing the iodine from the product stream 44 to produce the crude hydrogen iodide product stream 54 may continue uninterrupted. Once the product stream 44 is no longer directed to the second iodine removal train 48b, the first desublimator 50a and the second desublimator 50b of the second iodine removal train 48b may be heated to above the melting point of the iodine, liquefying the solid iodine so that it may flow through the first iodine recycle stream 56a and the second iodine recycle stream 56b of the second iodine removal train 48b. By continuing to switch between the first iodine removal train 48a and the second iodine removal train 48b, the unreacted iodine in the product stream 44 may be efficiently and continuously removed and recycled.

In the integrated process shown in FIG. 1, the crude hydrogen iodide product stream 54 is provided to a heavies distillation column 60. The heavies distillation column 60 may be configured for the separation of higher boiling point substances, such as hydrogen iodide and residual unreacted iodine, from lower boiling point substances, such as the unreacted hydrogen. A bottom stream 62 including the hydrogen iodide and residual unreacted iodine from the heavies distillation column 60 may be provided to an iodine recycle column 64. The iodine recycle column 64 may be configured for the separation of the residual unreacted iodine from the hydrogen iodide. A bottom stream 66 of the iodine recycle column 64 including the unreacted iodine is recycled back to third iodine dryer 57. The dried bottom stream 66 may be recycled back to the iodine liquefier 20. Alternatively, dried bottom stream 66 of the iodine recycle column 64 including the unreacted iodine may be recycled back to the iodine vaporizer 26. An overhead stream 68 of the iodine recycle column 64 including the hydrogen iodide may be provided to a product distillation column 70.

An overhead stream 72 including the hydrogen and residual hydrogen iodide from the heavies distillation column 60 may also be provided to the product distillation column 70. The product distillation column 70 may be configured to separate the unreacted hydrogen from the hydrogen iodide. An overhead stream 74 of the product column 70 including the unreacted hydrogen and residual hydrogen iodide may be recycled back to the reactor 40. The resulting purified hydrogen iodide product may be collected from a bottom stream 76 of the product column 70.

Figure 2:
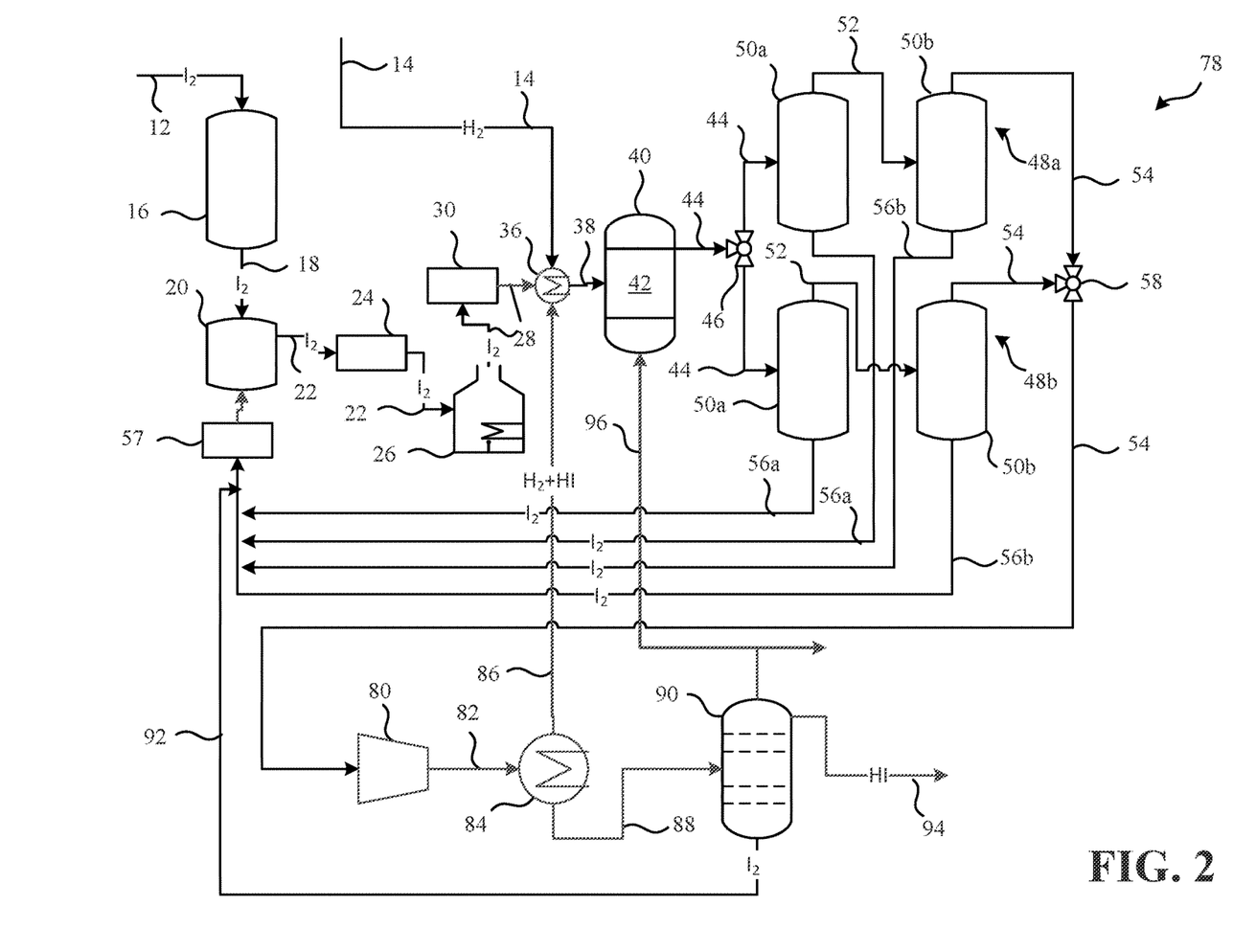
FIG. 2 is a process flow diagram showing another integrated process for manufacturing anhydrous hydrogen iodide from iodine and hydrogen.

FIG. 2 is a process flow diagram showing another integrated process for manufacturing anhydrous hydrogen iodide. The integrated process 78 shown in FIG. 2 is the same as the integrated process 10 described above in reference to FIG. 1 up to the production of the crude hydrogen iodide product stream 54. In the integrated process 78 of FIG. 2, the crude hydrogen iodide product stream 54 is provided to a compressor 80 to increase the pressure of the crude hydrogen iodide product stream 54 to facilitate the recovery of the hydrogen and the hydrogen iodide. The compressor 80 increases the pressure of the crude hydrogen iodide product stream 54 to a separation pressure, that is greater than an operating pressure of the reactor 42 to produce a compressed product stream 82. The compressed product stream 82 is directed to a partial condenser 84 where it is subjected to a one-stage flash cooling for the separation of higher boiling point substances, such as hydrogen iodide and trace amounts of residual, unreacted iodine, from lower boiling point substances, such as the unreacted hydrogen. An overhead stream 86 including hydrogen and residual hydrogen iodide from the partial condenser 84 may be recycled back to the reactor 40. A bottom stream 88 from the partial condenser 84 including the hydrogen iodide, trace amounts of residual unreacted iodine and trace amounts of water may be provided to a product column 90. The product column 90 may be configured for the separation of the residual unreacted iodine, the water and other higher boiling compounds from the hydrogen iodide. A bottom stream 92 of the product column 90 including the unreacted iodine is recycled back to the third iodine dryer 57. The dried bottom stream 92 is recycled back to the iodine liquefier 20. Alternatively, the dried bottom stream 92 of the product column 90 including the unreacted iodine may be recycled back to the iodine vaporizer 26. The resulting purified hydrogen iodide product may be collected from an overhead stream 94 of the product column 90. A purge stream 96 may be taken from the product column 90 to control the build-up of low boiling impurities. A portion of the purge stream 96 may be recycled back to the reactor 40, while another portion may be disposed of.

Although the embodiments shown in FIG. 1 and FIG. 2 include the first iodine dryer 24, the second iodine dryer 30 and the third iodine dryer 57, it is understood that embodiments include process having only one or two of the three iodine dryers shown.

While this invention has been described as relative to exemplary designs, the present invention may be further modified within the spirit and scope of this disclosure. Further, this application is intended to cover such departures from the present disclosure as come within known or customary practice in the art to which this invention pertains.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" is also considered as disclosing the range defined by the absolute values of the two endpoints.

The following non-limiting Examples serve to illustrate the disclosure.

EXAMPLES

Example 1A: Prophetic Example of Removing Water from $I_2$ Via Distillation

Using an Aspen simulation, it is estimated that a product stream of iodine ($I_2$) with a water content of less than 10 ppm may be achieved using the method of this Example.

An initial stream of 1000 pounds of iodine ($I_2$) with a water content of 2500 ppm will be fed to a distillation column having three theoretical stages, plus a reboiler and a condenser. The operating conditions of the reboiler may be as low as 0.15 lb boil up vapor per 1 lb of column bottom iodine ($I_2$) liquid flow, and the operating pressure will be 7.0 psia. Under these conditions, the estimated iodine ($I_2$) yield from the distillation column bottom is greater than 98 percent.

The low operating pressure is preferred such that conventional steam heating can be used to achieve the reboiler temperature, which was estimated at 156° C. The distillation column operating pressure may be higher, so long as a higher temperature heating medium is chosen. The distillation column may also include a rectifying section without a reboiler if the iodine ($I_2$) feed is partially or fully vaporized, or is present as superheated vapor.

Example 1 B: Prophetic Example of Removing Water from $I_2$ Via Single Stage Flash Using an Aspen simulation, it is estimated that iodine ($I_2$) with a water content of less than 100 ppm may be achieved using the method of this Example. One thousand pounds of liquid iodine ($I_2$) having a water content of 2500 ppm will be fed to a single stage flash unit, in which six percent of the iodine ($I_2$) is flashed off to the top. The operating pressure is 7.0 psia. The estimated iodine ($I_2$) yield from the single stage flash bottom is greater than 94 percent.

The low operating pressure is preferred such that conventional steam heating can be used to maintain the estimated flash temperature of 141° C. The flash can be conducted at higher pressure provided that a higher temperature heating medium is chosen. The flash can also be carried out adiabatically when the liquid iodine ($I_2$) feed is superheated to vaporize a portion of the iodine ($I_2$) and water mixture before entering the flash unit.

Using a multi-stage flash setup, equal or greater water removal and iodine ($I_2$) recovery efficiency may be achieved in comparison to a distillation column. Examples 1A and 1B show a range of iodine ($I_2$) dryness and recovery yield by operating with a different number of separation stages and boil up rates.

Example 2: Prophetic Example of Removal of Water from $I_2$ with Strong Acid Based on experience in fluorocarbon drying using sulfuric acid ($H_2SO_4$), and adjusting for higher operating temperature (116° C.), it is estimated that the method described in this Example may provide iodine ($I_2$) with a water content of less than 100 ppm.

One thousand pounds of iodine ($I_2$) with a water content of 2500 ppm will be mixed with an equal portion of 98% wt. sulfuric acid ($H_2SO_4$). Mixing will be preferably performed for 30 minutes at 116° C. to allow sufficient mass transfer and time for the water to be extracted by the concentrated sulfuric acid ($H_2SO_4$).

Following mixing, the reaction mixture will be allowed to settle for 30 minutes prior to phase separation. The bottom layer containing the dried iodine ($I_2$) liquid is withdrawn from the vessel, along with some residual dissolved sulfuric acid ($H_2SO_4$). The remaining lighter phase of partially spent sulfuric acid ($H_2SO_4$) will have been diluted from 98 wt. % to 97.3 wt. % after this first operation. New, wet iodine ($I_2$) may then be added into this partially spent sulfuric acid ($H_2SO_4$), and the operation described above may be repeated (for example, up to 16 times) until the sulfuric acid ($H_2SO_4$) has been diluted to 94% wt.

Upon reaching 94% wt. sulfuric acid ($H_2SO_4$), the spent sulfuric acid ($H_2SO_4$) will be disposed of and replaced with fresh sulfuric acid ($H_2SO_4$). The estimated 98% wt. sulfuric acid ($H_2SO_4$) consumption is estimated at 65 pounds per 1,000 pounds of iodine ($I_2$). Using a larger initial excess of sulfuric acid ($H_2SO_4$) will limit the frequency with which spent sulfuric acid ($H_2SO_4$) must be replaced.

The above-described batch drying process may easily be adapted to a continuous operation with continuous mixing and phase separation in one or more mixing tanks. The mixing of iodine ($I_2$) and sulfuric acid ($H_2SO_4$) may be accomplished using a standard agitator, pump mixing, pump around, static mixer, or flow through with long residence time.

Example 3: Prophetic Example of Water Removal from $I_2$ Via Counter-Current Extraction Based on experience in fluorocarbon drying using sulfuric acid ($H_2SO_4$) and adjusting for higher operating temperatures, it is estimated that the method described in this Example will provide iodine ($I_2$) with a water content of less than 700 ppm.

One thousand pounds per hour of heated iodine ($I_2$) vapor with a water content of 2500 ppm will be fed through the bottom of a counter-current packed tower. Hot, circulating 99% wt. sulfuric acid ($H_2SO_4$) will be fed through the top of the packed tower. The feed streams and the entire packed tower will be maintained at a temperature above 190° C. when operating at atmospheric pressure to prevent loss of iodine ($I_2$) through condensation into the liquid sulfuric acid ($H_2SO_4$).

Depending upon the packing material, a packed tower of approximately 18-inch diameter and 18-foot overall height is sufficient for drying for 1,000 lb/hr of heated iodine ($I_2$) vapor. Circulating 99 wt. % sulfuric acid ($H_2SO_4$) at a rate of 7 GPM/ft$^2$ will achieve good liquid distribution and mass transfer. The circulating flow of sulfuric acid ($H_2SO_4$) is calculated to be about 11,000 lb/hr.

Typically, a reservoir of 200 gallons or 2500 lbs of 99% wt. sulfuric acid ($H_2SO_4$) for this scale is used until the circulating sulfuric acid ($H_2SO_4$) has reached 97% wt., at which time the spent sulfuric acid ($H_2SO_4$) will be disposed of and replaced with a fresh batch. The estimated consumption of 99% wt. sulfuric acid ($H_2SO_4$) is 100 lbs per 1000 pounds of iodine ($I_2$).

Example 4: Prophetic Example of Removal of Water from Liquid $I_2$ Using Molecular Sieves It is estimated that the method described in this Example will produce iodine ($I_2$) with a water content of less than 50 ppm by weight.

One thousand pounds per hour of heated iodine ($I_2$) liquid with a water content of 2500 ppm will be fed to an 8:1 L/D vessel filled with 4 Å molecular sieves is operated at 116° C. and atmospheric pressure. Under these conditions, it is estimated that the molecular sieves will have the static water capacity shown below in Table 1, assuming that the regenerated molecular sieves have zero residual water content.

TABLE 1

| Water content in $I_2$ | Water capacity per 100 lb sieves |
|---|---|
| 50 ppm | 3.5 lb |
| 100 ppm | 4.5 lb |
| 500 ppm | 6.5 lb |
| 1000 ppm | 10.0 lb |
| 2500 ppm | 13.0 lb |

Using the above static adsorption capacities, an integral static capacity of 7.5 lb water per 100 lb of molecular sieves is estimated for drying iodine ($I_2$) to a water content of 50 ppm at atmospheric pressure and 116° C. For a continuous dynamic operation, a conservative 50% of the static capacity is assumed to account for mass transfer, residual moisture content after regeneration, and loss of adsorption efficiency due to aging of molecular sieves and/or co-adsorption of impurities. This results in 3.7 lb water per 100 lb of molecular sieves for the purposes of estimating the adsorption bed size and cycle time.

To process 1,000 lb/hr of iodine ($I_2$) with a water content of 2500 ppm by weight, about 2.5 lb of water will need to be removed. Using 3.7 lb water per 100 lb of molecular sieves, it is estimated that 68 lb of molecular sieves will be depleted each hour. For a two-day on (48 hours), two-day off regeneration drying cycle, one pair of molecular sieve beds, each having a 68 lbs/hr×48 hours=3,300 lb capacity, will be required.

After the molecular sieve bed has reached its water adsorption capacity, it can be regenerated using the following procedure. In a first step, the residual iodine ($I_2$) adhered to the molecular sieves may be recovered. This can be accomplished by draining off the iodine ($I_2$), or by further heating to remove the iodine ($I_2$) as vapor. This initial iodine ($I_2$) recovery step may be conducted under vacuum to provide additional driving force to speed up its removal.

After the above preparation step, the molecular sieve bed is regenerated by passing heated gas such as nitrogen or air through the bed while maintaining the bed at 230° C. or higher to desorb the water from the molecular sieves. It is expected that the initial introduction of the gas will remove some residual iodine ($I_2$). This residual iodine ($I_2$) may be vented to a caustic scrubber for disposal, or to a cold condenser to condense or de-sublimate out the residual iodine ($I_2$) for recovery.

Finally, following regeneration, the bed is cooled down to 116° C. for the next adsorption cycle.

Example 5: Adsorbent Screening

To screen potential adsorbents, experiments were performed at room temperature where different adsorbents were exposed to moisture, iodine vapors, and HI, after which the adsorbents analyzed by thermogravimetric analysis-mass spectrometry (TGA-MS). Samples exposed to moisture were analyzed by TGA. Briefly, about 2 g of the absorbent was added to separate glass vials, and the vials were placed inside a desiccator. The desiccant inside the desiccator was replaced with a beaker containing water or iodine. The cap of the desiccator was replaced, and the vent closed to isolate it from the surroundings. When water was used, the adsorbents were exposed for 3 days, while when iodine was used, they were exposed for 8 days. For exposure in HI, the adsorbents were charged to 150 mL sample cylinder, pressured checked at 250 psig, evacuated and charged with 150-200 g of HI. The HI used contained about 500 ppm of iodine. The sample cylinders were set upright at room temperature for 21 days. The adsorbents that were exposed include alumina (F200), molecular sieve (4 A), silica gel, hydrotalcite, and $NiI_2$ supported on alumina.

The table below shows comparative results for adsorption of iodine vapors and water for the different adsorbents at room temperature.

TABLE 2

| Material | Initial Weight, g | Final Weight, g | Weight change, g | Weight change, % | Pore opening, Å |
|---|---|---|---|---|---|
| Silica ($SiO_2$) | 2.182 | 3.2428 | 1.0608 | 48.6 | 3-60 |
| Activated alumina (F-200) | 2.0835 | 4.2412 | 2.1577 | 103.5 | — |
| Extruded Hydrotalcite ($Mg_4Al_2O_7$) (dried) | 2.1824 | 3.0203 | 0.8379 | 38.4 | 20-300 |
| Molecular sieves (4A) | 2.1582 | 2.7364 | 0.5782 | 26.7 | 3-5 |
| $NiI_2/Al_2O_3$ | 2.0168 | 2.8487 | 0.8319 | 41.2 | — |

Using the change in weight, it can be inferred that order of affinity for iodine vapors/water is 4 Å molecular sieves <hydrotalcite <nickel(II) iodide on alumina ($NiI_2/Al_2O_3$) <silica gel<alumina. The potential candidate should display little or insignificant adsorption of iodine. Based on this result, 4 Å molecular sieves would be the preferred adsorbent, perhaps due to the small pore openings which restrict iodine from entering the pores, leading to preferential adsorption for moisture. The water absorption capacity for various materials are shown below in Table 3, both at STP (0° C. and 1 atm) and at 52° C.

TABLE 3

| Material | $H_2O$ Capacity at STP, % | $H_2O$ Capacity at 52 deg C., % | $H_2O/I_2$ Capacity at 52 deg C., %[b] |
|---|---|---|---|
| Silica ($SiO_2$) | 40 | 29.2 | 29.3 |
| Activated alumina (F-200) | 20 | 12.7 | 10.9 |
| Extruded Hydrotalcite ($Mg_4Al_2O_7$) (dried)[a] | TBD | 13.5 | 0.5 |
| Molecular sieve (4A) | 20 | 14.3 (4A) | 18.6 |
| $NiI_2/Al_2O_3$ | 35 | 20.8 | 29.4 |

[a]Value obtained from desorption isotherm
[b]Capacity after competitive adsorption of water/iodine vapors Example 6: Iodine Drying About 10 g of iodine with a water content of about 200 to 1700 ppm was added to each of three Fisher-Porter tubes, together with about 0.1 g adsorbent (UZM Zeolite, Sorbeads WS with calcium nitrate, and hydrotalcite) and the mixture was heated to and maintained at about 130° C. for 12 hrs followed by cooling to room temperature. An aliquot of the solid was removed under nitrogen atmosphere in a glove box, dissolved in deuterated chloroform ($CDCl_3$) and analyzed by $^1H$ NMR for the presence of water. The results are given below in Table 4, with the amounts of water shown in ppm as measured by $^1H$ NMR.

TABLE 4

| Adsorbent | $H_2O$ content of $I_2$ before drying (ppm) | $H_2O$ content of $I_2$ after drying (ppm) |
|---|---|---|
| UZM Zeolite A | 1700 | About 50 |
| Sorbead WS beads with calcium nitrate | 203 | About 10 |
| Hydrotalcite | 203 | About 5 |

Example 7A: Prophetic Example of Removal of Water from $I_2$ by Mixing with HI

Using an Aspen simulation, it is estimated that iodine ($I_2$) with a water content of less than 35 ppm may be achieved using the method of this Example.

One thousand pounds of iodine ($I_2$) having a water content of 2500 ppm by weight is contacted with hydrogen iodide (HI) having a water content of 10 ppm by weight at a rate of 300 lb/hr HI at 116° C. and 20 psig pressure for one hour. The method may be used in a batchwise or continuous process. The estimated rate loss of iodine ($I_2$) at this volume of hydrogen iodide (HI) can be held to 25 lb/hr, or less than three percent of the starting iodine ($I_2$).

The hydrogen iodide (HI) used to remove the water from the iodine ($I_2$) can be then sent to a distillation column to concentrate the water such that the water can be disposed of without significant loss of hydrogen iodide (HI). Alternatively, or additionally, the hydrogen iodide (HI) used to remove the water from the iodine ($I_2$) can be dried by any of the methods described in co-pending U.S. patent application 63/137,470 entitled METHODS FOR PRODUCING ANHYDROUS HYDROGEN IODIDE (HI), the contents of which is hereby incorporated by reference in its entirety.

Example 7B: Prophetic Example of Removal of Water from HI Used to Remove Water from $I_2$ Using an Aspen simulation, 302 lb/hr of hydrogen iodide (HI) vapor containing 0.8% wt. water and 8% wt. iodine ($I_2$) is fed to a distillation column having three theoretical stages, plus a reboiler and a condenser. The specified operating reflux ratio is 2.0, and the operating pressure is 20 psig. Under these operating conditions, the estimated hydrogen iodide (HI) recovery from the column overhead is greater 98%, including less than 10 ppm wt. each of water and iodine ($I_2$). This recovered hydrogen iodide (HI) may readily be re-used or recycled for the iodine ($I_2$) drying operation.

The distillation column bottoms product contains nearly all of the water (2.5 lb/hr) removed from the iodine ($I_2$) drying operation, along with the 2% hydrogen iodide (HI) yield loss (4.2 lb/hr), and the 3% iodine ($I_2$) yield loss from the drying operation (25 lb/hr). Alternatively, or additionally, the hydrogen iodide (HI) used to remove the water from the iodine ($I_2$) can be dried by any of the methods described in co-pending U.S. patent application 63/137,470 entitled METHODS FOR PRODUCING ANHYDROUS HYDROGEN IODIDE (HI).

Example 8A: Prophetic Example of Removal of Water from $I_2$ Via Distillation

Using Aspen simulation, it is estimated that iodine ($I_2$) with a water content of less than 15 ppm may be produced using the method described in this Example.

One thousand pounds per hour of iodine ($I_2$) with a water content of 2500 ppm by weight will be fed to the top of a distillation column having three theoretical stages, plus a reboiler and a condenser. Hydrogen iodide (HI) with a water content of 10 ppm by weight is fed to the column bottom at a rate of 300 lb/hr. The specified operating reboiler conditions are set at 0.4 lb boil up vapor per pound of column bottom iodine ($I_2$) flow when the incoming feeds to the column are both at a temperature of 116° C., and the operating pressure is 25 psig. Under theses operating conditions, the estimated iodine ($I_2$) recovery from the column bottom is greater than 99.9 percent, with a water content of less than 10 ppm weight. The dried iodine ($I_2$) is expected to contain 2.5% wt. hydrogen iodide (HI).

The hydrogen iodide (HI) used to remove water from the iodine ($I_2$) is then sent to a distillation column to concentrate the water so that it may be disposed of without significant loss of hydrogen iodide (HI). Alternatively, or additionally, the hydrogen iodide (HI) used to remove the water from the iodine ($I_2$) can be dried by any of the methods described in co-pending U.S. patent application 63/137,470 entitled METHODS FOR PRODUCING ANHYDROUS HYDROGEN IODIDE (HI).

Example 8B: Prophetic Example of Removal of Water from $I_2$ Via Multi-Stage Distillation Using an Aspen simulation, 280 lb/hr of wet hydrogen iodide (HI) vapor containing 0.8% wt. water and 0.4% wt. iodine ($I_2$) is fed to a distillation column having three theoretical stages plus a reboiler and a condenser. The specified reflux ratio is 2.0, and the operating pressure is 20 psig. Under these operating conditions, the estimated hydrogen iodide (HI) recovery from the column overhead is greater than 98%, having less than 10 ppm wt. each of water and iodine ($I_2$). This hydrogen iodide (HI) thus recovered may readily be re-used or recycled for the iodine ($I_2$) drying operation.

The distillation column bottoms product contains the water (2.5 lb/hr) removed from the iodine ($I_2$) drying operation, along with the 2% hydrogen iodide (HI) yield loss (4.2 lb/hr), and the 0.1% iodine ($I_2$) yield loss from the drying operation (0.9 lb/hr). Alternatively, or additionally, the hydrogen iodide (HI) used to remove the water from the iodine ($I_2$) can be dried by any of the methods described in co-pending U.S. patent application 63/137,470 entitled METHODS FOR PRODUCING ANHYDROUS HYDROGEN IODIDE (HI).

Example 9: Prophetic Example of Removal of Water from $I_2$ Using Heated Inert Gas Using an Aspen simulation, it is estimated that iodine ($I_2$) with a water content of less than 35 ppm may be produced using the method described in this Example.

One thousand pounds of iodine ($I_2$) with a water content of 2500 ppm by weight is contacted with dry nitrogen at a rate of 19 lb/hr and a temperature of 116° C. at atmospheric pressure for one hour. The method may be used in a batchwise or continuous process. The estimated loss of iodine ($I_2$) when using this amount of nitrogen may be held to less than three percent of the iodine ($I_2$) feed, or 30 pounds per 1000 pounds of wet iodine ($I_2$). The drying nitrogen effluent contains 19 pounds of nitrogen, 30 pounds of iodine ($I_2$) and 2.5 pounds of water for every 1000 pounds of iodine ($I_2$) dried.

Example 10: Determination of Water Content in Commercially Available $I_2$

Using $^1$H NMR, the water content of iodine ($I_2$) prills from two suppliers was estimated to be 2000-3000 ppm. As iodine ($I_2$) is sparingly hygroscopic, this includes water picked up during handling.

The experiment for the removal of water from the iodine ($I_2$) prills was performed inside a 250 mL Fisher-Porter tube. The cap on the tube was modified to have an inlet and outlet, with double block valves. The tube was sealed using FETFE 0-rings and stainless-steel grade thread seal tape was used on the threaded fittings on the cap. To perform the measurement, about 150 g of iodine ($I_2$) prills were added the Fisher-Porter tube. The tube was pressure checked at room temperature to 50 psig (rated at RT for 150 psig). When connected to the system, the tube was again pressure-checked at 50 psig, pulse-purged three times using UHP nitrogen (less than 0.5 ppm water content), and the internal pressure was adjusted to 10 psig. The oven temperature was set to 130° C. Note that the melting point of iodine is 113° C. and ball valves inside the oven are rated for 150° C. When the oven temperature reached 130° C., the temperature was held for 2 hours, followed by a UHP nitrogen gas purge at 50 mL/min for 1 hour. The ball valves on the Fisher-Porter tube were closed at about 10 psig, and the oven was turned off and allowed to cool to room temperature. The Fisher-Porter tube was isolated at the fitting above the second ball valve and sent for analysis by $^1$H NMR. The Fisher-Porter tube was opened inside a glove box, and a sample obtained for analysis.

Table 5 shows results for the samples prepared using the procedure described above. As shown in Table 5 below, the water content of the iodine ($I_2$) prills can be reduced to less than 20 ppm and less than 75 ppm for the prills supplied by supplier A and supplier B, respectively. It is expected that, with different purge time and/or temperature, the drying of iodine ($I_2$) with dry nitrogen or other inert gas can reach nearly zero water content.

TABLE 5

| Vendor | Water content before $N_2$ purge (reported by vendor), ppm | Water content after $N_2$ purge for 60 minutes, ppm |
|---|---|---|
| A | 3200 | 11 +/- 2 |
| B | 3000 | 40 +/- 29 |

ASPECTS

Aspect 1 is a method of removing water from a mixture of iodine ($I_2$) and water, the method including providing a mixture comprising iodine and water and contacting the mixture with an adsorbent to selectively absorb water from the mixture.

Aspect 2 is the method of Aspect 1, wherein in the providing step, the mixture has a water concentration of from about 500 ppm to about 5,000 ppm by weight.

Aspect 3 is the method of Aspect 1, wherein in the providing step, the mixture has a water concentration of from about 1,000 ppm to about 3,000 ppm by weight.

Aspect 4 is the method of any of Aspects 1-3, wherein in the contacting step, the mixture is in the vapor phase.

Aspect 5 is the method of any of Aspects 1-3, wherein in the contacting step, the mixture is in the liquid phase.

Aspect 6 is the method of any of Aspects 1-5, wherein the adsorbent is selected from the group consisting of: molecular sieves having a pore diameter of 3 Å-5 Å, silica gel, alumina, calcium sulfate, calcium chloride, calcium iodide, zeolite, magnesium chloride, magnesium iodide, phosphorous pentoxide, nickel(II) iodide ($NiI_2$), aluminosilicate, silica gel with calcium nitrate, and hydrotalcite.

Aspect 7 is the method of any of Aspects 1-5, wherein the adsorbent is selected from the group consisting of: molecular sieves having a pore diameter of 3 Å-5 Å, nickel(II) iodide ($NiI_2$), hydrotalcite, and silica gel.

Aspect 8 is the method of any of Aspects 1-5, wherein the adsorbent is selected from the group consisting of: molecular sieves having a pore diameter of 3 Å-5 Å and hydrotalcite.

Aspect 9 is the method of any of Aspects 1-8, further comprising regenerating the adsorbent by heating the adsorbent to a temperature from about 150° C. to about 350° C.

Aspect 10 is the method of any of Aspects 1-8, further comprising regenerating the adsorbent by heating the adsorbent to a temperature from about 200° C. to about 300° C.

Aspect 11 is the method of any of Aspects 1-10, wherein after the contacting step, the water content of the mixture is 500 ppm or less by weight.

Aspect 12 is the method of any of Aspects 1-10, wherein after the contacting step, the water content of the mixture is 100 ppm or less by weight.

Aspect 13 is the method of any of Aspects 1-10, wherein after the contacting step, the water content of the mixture is 10 ppm or less by weight.

Aspect 14 is the method of any of Aspects 1-10, wherein after the contacting step, the water content of the mixture is 1 ppm or less by weight.

Aspect 15 is a method of removing water from a mixture of iodine ($I_2$) and water, the method including providing a mixture comprising iodine and water and contacting the mixture with a concentrated acid to absorb water from the mixture.

Aspect 16 is the method of Aspect 15, wherein in the providing step, the mixture has a water concentration of from about 500 ppm to about 5,000 ppm by weight.

Aspect 17 is the method of Aspect 15, wherein in the providing step, the mixture has a water concentration of from about 1,000 ppm to about 3,000 ppm by weight.

Aspect 18 is the method of any of Aspects 15-17, wherein the concentrated acid is selected from the group consisting of: sulfuric acid ($H_2SO_4$), phosphoric acid ($H_3PO_4$) and meta-phosphoric acid ($HPO_3$).

Aspect 19 is the method of any of Aspects 15-18, wherein in the contacting step, the mixture contacts the concentrated acid in a contactor selected from the group consisting of: a counter-current packed or trayed column, a co-current packed or trayed column, a mixing vessel, a liquid-liquid extraction tower and an eductor.

Aspect 20 is the method of any of Aspects 15-19, wherein in the contacting step, the mixture is a biphasic mixture and the method further comprises separating the biphasic mixture by phase separation.

Aspect 21 is the method of any of Aspects 15-20, wherein after the contacting step, the water content of the mixture is 500 ppm or less by weight.

Aspect 22 is the method of any of Aspects 15-20, wherein after the contacting step, the water content of the mixture is 100 ppm or less by weight.

Aspect 23 is the method of any of Aspects 15-20, wherein after the contacting step, the water content of the mixture is 10 ppm or less by weight.

Aspect 24 is the method of any of Aspects 15-20, wherein after the contacting step, the water content of the mixture is 1 ppm or less by weight.

Aspect 25 is a method of removing water from a mixture of iodine ($I_2$) and water, the method including providing a mixture comprising iodine and water and separating the water from mixture by distillation.

Aspect 26 is the method of Aspect 25, wherein in the providing step, the mixture has a water concentration of from about 500 ppm to about 5,000 ppm by weight.

Aspect 27 is the method of Aspect 25, wherein in the providing step, the mixture has a water concentration of from about 1,000 ppm to about 3,000 ppm by weight.

Aspect 28 is the method of any of Aspects 25-27, wherein in the separating step, the distillation is in a distillation column having three or more theoretical stages.

Aspect 29 is the method of any of Aspects 25-27, wherein in the separating step, the distillation includes a multi-stage flash.

Aspect 30 is the method of any of Aspects 25-29, wherein after the separating step, the water content of the mixture is 500 ppm or less by weight.

Aspect 31 is the method of any of Aspects 25-29, wherein after the contacting step, the water content of the mixture is 100 ppm or less by weight.

Aspect 32 is the method of any of Aspects 25-29, wherein after the contacting step, the water content of the mixture is 10 ppm or less by weight.

Aspect 33 is the method of any of Aspects 25-29, wherein after the contacting step, the water content of the mixture is 1 ppm or less by weight.

Aspect 34 is a method of removing water from a mixture of iodine ($I_2$) and water, the method including providing a mixture comprising iodine and water and contacting the mixture with a gas that is inert to iodine ($I_2$), the gas stripping water from the mixture.

Aspect 35 is the method of Aspect 34, wherein the gas that is inert to iodine ($I_2$) is selected from the group consisting of nitrogen, air, carbon dioxide, helium, argon, pentafluoropropane (HFC-245fa), 2,2-dichloro-1,1,1-trifluoroethane (HCFC-123), 1-chloro-1,2,2,2-tetrafluoroethane (HCFC-124), pentafluoroethane (HFC-125), 1,1,1,2-tetrafluoroethane (HFC-134a), difluoromethane (HFC-32), and trifluoroiodomethane ($CF_3I$).

Aspect 36 is the method of either of Aspects 34 or 35, wherein the gas that is inert to iodine ($I_2$) includes nitrogen.

Aspect 37 is the method of any of Aspects 34-36, wherein in the providing step, the mixture has a water concentration of from about 500 ppm to about 5,000 ppm by weight.

Aspect 38 is the method of any of Aspects 34-36, wherein in the providing step, the mixture has a water concentration of from about 2,000 ppm to about 3,000 ppm by weight.

Aspect 39 is the method of any of Aspects 34-38, further comprising, prior to the contacting step, heating the gas that is inert to iodine ($I_2$).

Aspect 40 is the method of any of Aspects 34-39, wherein in the contacting step is carried out in a single stage.

Aspect 41 is the method of any of Aspects 34-39, wherein in the contacting step is carried out in more than one stage.

Aspect 42 is the method of any of Aspects 34-41, wherein in the contacting step, the mixture and the gas that is inert to iodine ($I_2$) flow in opposite directions.

Aspect 43 is the method of any of Aspects 34-41, wherein in the contacting step, the mixture and the gas that is inert to iodine ($I_2$) flow in the same direction.

Aspect 44 is the method of any of Aspects 34-43, wherein after the separating step, the water content of the mixture is 500 ppm or less by weight.

Aspect 45 is the method of any of Aspects 34-43, wherein after the contacting step, the water content of the mixture is 100 ppm or less by weight.

Aspect 46 is the method of any of Aspects 34-43, wherein after the contacting step, the water content of the mixture is 10 ppm or less by weight.

Aspect 47 is the method of any of Aspects 34-43, wherein after the contacting step, the water content of the mixture is 1 ppm or less by weight.

Aspect 48 is a method of removing water from a mixture of iodine ($I_2$) and water, the method including providing a mixture comprising iodine and water and contacting the mixture with hydrogen iodide (HI), the hydrogen iodide (HI) stripping water from the mixture.

Aspect 49 is the method of Aspect 48, wherein in the providing step, the mixture has a water concentration of from about 500 ppm to about 5,000 ppm by weight.

Aspect 50 is the method of Aspect 48, wherein in the providing step, the mixture has a water concentration of from about 2,000 ppm to about 3,000 ppm by weight.

Aspect 51 is the method of any of Aspects 48-50, further comprising, prior to the contacting step, heating the hydrogen iodide (HI).

Aspect 52 is the method of any of Aspects 48-51, wherein in the contacting step is carried out in a single stage.

Aspect 53 is the method of any of Aspects 48-51, wherein in the contacting step is carried out in more than one stage.

Aspect 54 is the method of any of Aspects 48-53, wherein in the contacting step, the mixture and the hydrogen iodide (HI) flow in opposite directions.

Aspect 55 is the method of any of Aspects 48-53, wherein in the contacting step, the mixture and the hydrogen iodide (HI) flow in the same direction.

Aspect 56 is the method of any of Aspects 48-55, wherein after the separating step, the water content of the mixture is 500 ppm or less by weight.

Aspect 57 is the method of any of Aspects 48-55, wherein after the contacting step, the water content of the mixture is 100 ppm or less by weight.

Aspect 58 is the method of any of Aspects 48-55, wherein after the contacting step, the water content of the mixture is 10 ppm or less by weight.

Aspect 59 is the method of any of Aspects 48-55, wherein after the contacting step, the water content of the mixture is 1 ppm or less by weight.

Aspect 60 is the method of any of Aspects 48-59, further comprising, after the contacting step, separating the water from the hydrogen iodide (HI) by distillation.

What is claimed is:

1. A method of removing water from a mixture of iodine ($I_2$) and water, the method comprising:
   providing a mixture comprising iodine and water, wherein the mixture has a water concentration of from about 500 ppm to about 5,000 ppm by weight; and
   contacting the mixture with a solid adsorbent to selectively adsorb water from the mixture,
   wherein the adsorbent is selected from the group consisting of: molecular sieves having a pore diameter of 3 Å-5 Å, nickel (II) iodide ($NiI_2$), and hydrotalcite,
   wherein after the contacting step, the water content of the mixture is 100 ppm or less by weight.

2. The method of claim 1, wherein in the providing step, the mixture has a water concentration of from about 500 ppm to about 3,000 ppm by weight.

3. The method of either claim 1, wherein in the contacting step, the mixture is in the vapor phase.

4. The method of either claim 1, wherein in the contacting step, the mixture is in the liquid phase.

5. The method of claim 1, wherein the adsorbent comprises molecular sieves having a pore diameter of 3 Å-5 Å.

6. The method of claim 1, wherein the adsorbent comprises nickel (II) iodide ($NiI_2$).

7. The method of claim 1, wherein the adsorbent comprises hydrotalcite.

8. The method of claim 1, further comprising regenerating the adsorbent by heating the adsorbent to a temperature from 175° C. to 350° C.

9. A method of removing water from a mixture of iodine ($I_2$) and water in a vapor phase, the method comprising:
   providing a vapor mixture comprising iodine and water, wherein the mixture has a water concentration of from about 500 ppm to about 5,000 ppm by weight; and
   contacting the mixture with a concentrated acid to absorb water from the mixture;
   wherein after the contacting step, the water content of the mixture is 100 ppm or less by weight.

10. The method of claim 9, wherein in the providing step, the mixture has a water concentration of from about 500 ppm to about 3,000 ppm by weight.

11. The method of claim 9, wherein the concentrated acid is selected from the group consisting of: sulfuric acid ($H_2SO_4$), phosphoric acid ($H_3PO_4$) and meta-phosphoric acid ($HPO_3$).

12. The method of claim 9, wherein in the contacting step, the mixture is a biphasic mixture and the method further comprises separating the biphasic mixture by phase separation.

13. The method of claim 1, further comprising the additional step, after the providing step, of contacting the mixture comprising iodine and water with an inert gas.

14. The method of claim 13, wherein the inert gas is nitrogen.

15. The method of claim 1, wherein after the contacting step, the water content of the mixture is 10 ppm or less by weight.

16. The method of claim 9, wherein after the contacting step, the water content of the mixture is 10 ppm or less by weight.

* * * * *